US007920517B2

(12) United States Patent
Bachl et al.

(10) Patent No.: US 7,920,517 B2
(45) Date of Patent: Apr. 5, 2011

(54) UPLINK LOAD CONTROL INCLUDING INDIVIDUAL MEASUREMENTS

(75) Inventors: Rainer W. Bachl, Nuremberg (DE); Jens Mueckenheim, Nuremberg (DE); Mirko Schacht, Munich (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1089 days.

(21) Appl. No.: 11/414,525

(22) Filed: Apr. 28, 2006

(65) Prior Publication Data

US 2007/0253363 A1 Nov. 1, 2007

(51) Int. Cl.
*H04Q 7/00* (2006.01)

(52) U.S. Cl. ...... 370/329; 455/552; 455/456; 455/152.6; 455/45.2; 455/442; 455/67.11; 455/69; 455/70; 370/320; 370/335; 370/342; 370/508; 370/399; 370/338

(58) Field of Classification Search ............ 455/69, 455/522, 68, 456.6, 442, 67.13, 226.3, 512, 455/67.11, 152.2, 226.2, 45.2, 70; 370/342, 370/328, 338, 320, 337, 508, 335, 329, 37, 370/412, 399, 350; 375/341; 335/492
See application file for complete search history.

(56) References Cited

U.S. PATENT DOCUMENTS

| | | | | |
|---|---|---|---|---|
| 6,266,014 | B1* | 7/2001 | Fattouche et al. | 342/450 |
| 6,944,172 | B2* | 9/2005 | Sankey et al. | 370/412 |
| 7,193,978 | B2* | 3/2007 | Ishikawa et al. | 370/320 |
| 7,565,163 | B2* | 7/2009 | Kondo | 455/522 |
| 2002/0114289 | A1* | 8/2002 | Ishikawa et al. | 370/320 |
| 2004/0058687 | A1* | 3/2004 | Kim et al. | 455/452.2 |
| 2004/0100926 | A1* | 5/2004 | Sipila et al. | 370/328 |
| 2004/0142692 | A1* | 7/2004 | Schwarz et al. | 455/442 |
| 2004/0228349 | A1 | 11/2004 | Vrzic et al. | |
| 2004/0242257 | A1* | 12/2004 | Valkealahti et al. | 455/522 |
| 2006/0062283 | A1* | 3/2006 | Zhang et al. | 375/147 |
| 2006/0120408 | A1* | 6/2006 | Willenegger | 370/508 |
| 2006/0126578 | A1* | 6/2006 | Nagai | 370/337 |
| 2006/0135073 | A1* | 6/2006 | Kurapati et al. | 455/67.11 |
| 2006/0159013 | A1 | 7/2006 | Lee et al. | |

(Continued)

FOREIGN PATENT DOCUMENTS

EP 1583270 A1 10/2005

(Continued)

OTHER PUBLICATIONS

International Search Report and Written Opinion of the International Searching Authority for International application No. PCT/US2007/009735 mailed Jan. 15, 2008.

(Continued)

*Primary Examiner* — Marivelisse Santiago-Cordero
*Assistant Examiner* — Joseph Arevalo
(74) *Attorney, Agent, or Firm* — Carlson, Gaskey & Olds, P.C.

(57) ABSTRACT

A technique is disclosed for determining values of different portions of a total uplink interference, which can be used for scheduling and load control at a base station, for example. A disclosed example includes obtaining measurements from individual users and using those measurements to determine corresponding portions of a total uplink interference at the base station. One portion is associated with users that are controlled by a scheduler for that base station. Another portion is associated with users that are not controlled by that scheduler. Determining each of the portions individually and using a received total wideband power measurement allows for determining each of the major portions of the total uplink interference at a base station.

18 Claims, 1 Drawing Sheet

U.S. PATENT DOCUMENTS

| | | | |
|---|---|---|---|
| 2006/0183495 A1* | 8/2006 | Soliman | 455/522 |
| 2006/0234753 A1* | 10/2006 | Kondo | 455/522 |
| 2007/0021071 A1* | 1/2007 | Brouwer | 455/69 |
| 2007/0104164 A1* | 5/2007 | Laroia et al. | 370/338 |
| 2007/0111669 A1* | 5/2007 | Malladi | 455/67.13 |
| 2007/0140168 A1* | 6/2007 | Laroia et al. | 370/330 |
| 2007/0177536 A1* | 8/2007 | Brueck et al. | 370/328 |

FOREIGN PATENT DOCUMENTS

| | | |
|---|---|---|
| WO | 2004114705 A2 | 12/2004 |
| WO | 2006077141 A1 | 7/2006 |

OTHER PUBLICATIONS

Tdoc R1-050753, HSUPA RRM related signalling, 3GPP TSG-RAN WG1 Meeting #42, London, UK, Aug. 29-Sep. 2, 2005—Nokia.

Tdoc R1-061045, Introduction of an E-DCH related Node B measurement for RRM purposes, 3GPP TSG RAN WG1 #44bis meeting, Athens, Greece, Mar. 27-31, 2006.

Internnational Preliminary Report on Patentability for International application No. PCT/US2007/009735, mailed Nov. 6, 2008.

* cited by examiner

US 7,920,517 B2

UPLINK LOAD CONTROL INCLUDING INDIVIDUAL MEASUREMENTS

FIELD OF THE INVENTION

This invention generally relates to communication. More particularly, this invention relates to wireless communications.

DESCRIPTION OF THE RELATED ART

Wireless communication systems are well known. Various techniques must be employed to ensure appropriate communications on behalf of subscribers using mobile stations such as cell phones, laptop computers or personal digital assistants. One aspect of providing wireless communication services involves managing the call load at a base station transceiver. Known load control techniques involve the resource management functionality of base stations and associated radio network controllers, for example.

Known load control algorithms are arranged to manage uplink resources by managing the interference at a base station. Total uplink interference is typically represented by the received total wideband power (RTWP) at a base station, which is typically measured in dBm.

Within a cell (e.g., the area of coverage associated with a base station), the total interference is usually considered to have three portions. Background noise is typically always present and considered one of the three portions. Background noise is caused by sources that are not under control of the wireless communication system. Examples of background noise include thermal noise, man-made noise, interference from other mobile systems, jammers and interference originating from wireless communication users that do not have active radio links in the cell of interest.

A second portion of the total uplink interference is caused by wireless communication system users that are not controlled by the scheduler associated with the base station. The most common sources of such interference are uplink dedicated channel (DCH) users, uplink control channels such as the high-speed dedicated physical control channel (HS-DPCCH) and enhanced dedicated (uplink) physical control channel (E-DPCCH), and non-scheduled E-DCH transmissions, which may be applied to support delay-sensitive traffic such as VoIP. For discussion purposes, wireless communication system users that fit into this category are referred to as "non-E-DCH users." Such users have active radio links within the cell but are not controlled by the E-DCH scheduler for that cell.

A third portion of the total uplink interference is caused by the users that are controlled by the E-DCH scheduler of that cell. Some of such users from the serving cell are controlled by sending dedicated relative scheduling grants, absolute scheduling grants or both to each individual user. Users from non-serving cells also fit into this category and are controlled by sending common relative scheduling grants to all or a group of such users. For purposes of discussion, users that contribute to this portion of the interference are referred to as "E-DCH users."

The interference associated with non-E-DCH users is typically controlled by the radio network controller (RNC). As known, RNC load control is typically arranged to prevent overload using admission control and to overcome an overload situation using congestion control. There are known techniques for such controls.

The amount of interference contributed by the E-DCH users is typically controlled by a scheduler at or associated with a base station. Such schedulers are known to use constraints such as keeping the total interference below a target RTWP value, which is typically dictated by the RNC. The base station scheduler also typically maintains a ratio between received power from E-DCH users of other cells and the total received E-DCH power at a desired level, which is also typically dictated by the RNC. Another constraint used by base station schedulers is that only resources that have been left over from other users can be taken for scheduled E-DCH users. There are known scheduling techniques that accomplish these goals.

For efficient scheduling and load control, it becomes desirable or necessary to estimate the different contributing portions of the total interference at a base station. For example, it is desirable to know the background noise level and the portions of the interference coming from the non-E-DCH users and the E-DCH users, respectively.

Current techniques include measuring the background noise by taking pure RTWP measurements during silent periods assuming that no traffic is present. This is often done at night when there is a greater likelihood of no traffic. A drawback associated with an estimate of background noise from a silent period is that the estimate may become outdated at the time of implementation of load control or scheduling. This is because external interference may fluctuate over time, for example. Attempting to introduce silent periods more frequently presents substantial signaling effort and synchronization challenges and, therefore, is not practical.

Others have proposed to provide measurements of the non-E-DCH and E-DCH user contributions, respectively. No detailed approaches have been suggested regarding how such measurements can be obtained with sufficient accuracy. Further, it is widely known that absolute measurements in CDMA systems are quite inaccurate. Recent UMTS standard requirements, for example, only require absolute accuracy within a tolerance of +/−4 dB for RTWP measurements.

There is a need for a useable method of determine the individual portions of the uplink interference such as the portions associated with the non-E-DCH users and the E-DCH users, respectively. This invention addresses that need.

SUMMARY OF THE INVENTION

An exemplary method of facilitating wireless communications includes determining a portion of an uplink interference associated with users who are controlled by a scheduler from measurements of a data-chip energy to total interference ratio and a traffic to pilot ratio from the users that are controlled by the scheduler. A portion of the uplink interference associated with users that are not controlled by the scheduler is determined from data-chip energy to total interference ratio and traffic to pilot power ratio measurements from the users that are not controlled by the scheduler.

One example includes determining a product of the data-chip energy to total interference ratio and the traffic to pilot power ratio for each user that is controlled by the scheduler and includes determining a sum of all the products for such users as an indication of a signal to interference ratio for such users. An example also includes doing the same for all of the users not controlled by the scheduler for determining an indication of a signal to interference ratio for those users.

One example includes using a plurality of such sums associated with distinct time intervals and a system of linear equations that provides an ability to determine an absolute value for each portion of the uplink interference.

One advantage associated with a disclosed example technique is that it uses actual measurements from individual users for determining an absolute value of the different portions of the uplink interference to provide reliable information in a relatively low cost manner.

The various features and advantages of this invention will become apparent to those skilled in the art from the following detailed description. The drawings that accompany the detailed description can be briefly described as follows.

DETAILED DESCRIPTION

The disclosed example techniques for determining contributions to a total uplink interference are useful for load control and scheduling in wireless communication systems. The disclosed examples include using individual measurements from different types of users who contribute to the total interference to provide reliable interference information.

Figure 1:
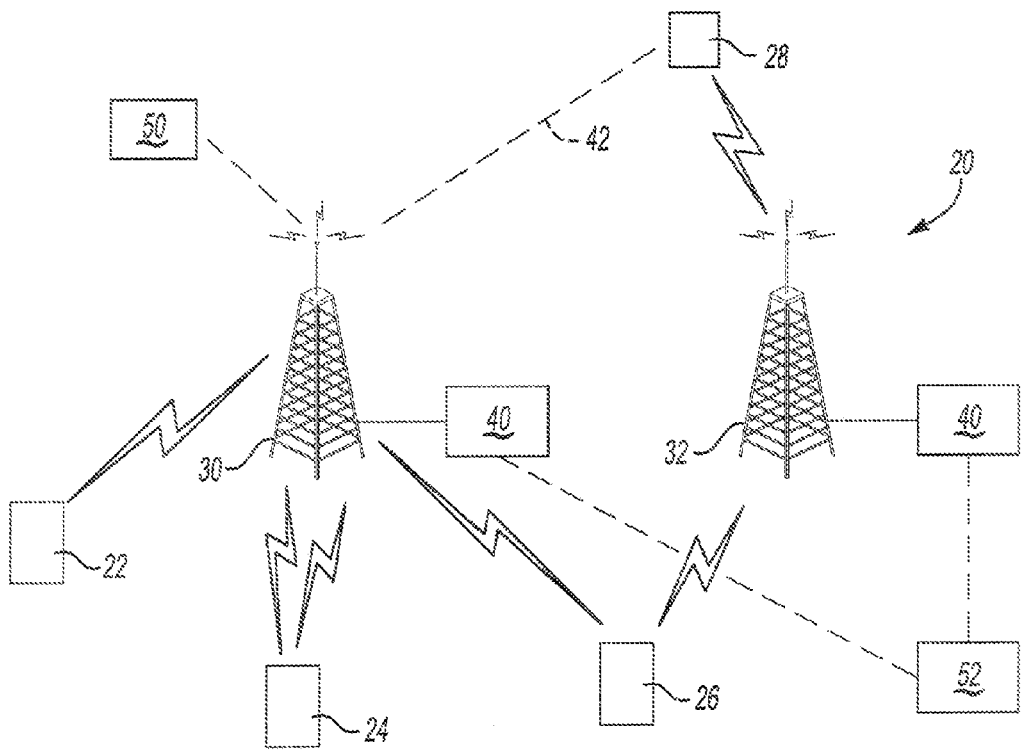
FIG. 1 schematically shows selected portions of a wireless communication system that is useful with an embodiment of this invention.

FIG. 1 schematically shows selected portions of an example wireless communication system 20. A plurality of mobile stations 22, 24, 26 and 28 communicate with one or more base stations 30, 32. In the illustrated example, the mobile station 22 is communicating with the base station 30. The example mobile station 24 is in a so-called softer handoff mode switching between sectors that are both served by the base station 30. The example mobile station 26 is in a soft handoff mode between the base stations 30 and 32. The example mobile station 28 is in communication with the base station 32.

The example base stations 30 and 32 each include a control module 40 that includes suitable programming for monitoring the interference level on an uplink or reverse link. In one example, the control modules 40 also include a scheduler that uses a known scheduling algorithm.

The example control modules 40 perform various functions to determine an amount of interference caused by a current call load at the base station and other factors that can influence the amount of interference. These other factors include background noise and interference from mobiles outside of the cell. The example of FIG. 1 schematically shows interference at 42 that is caused at the base station 30 because of signals transmitted by the mobile station 28. In this example, the mobile station 28 does not communicate intentionally with the base station 30. At the same time, however, signals transmitted by the mobile station 28 schematically shown at 42 are being received at the base station 30 and contribute to interference at the base station 30. Of course, the mobile station 28 contributes to the total call load of the base station 32, with which it is communicating.

FIG. 1 also schematically shows other background noise interference sources at 50. Example sources of such interference include thermal noise, man-made noise and jammers.

Because the mobile stations 22 and 24 are communicating with the base station 30, they are considered to be E-DCH users within the cell of the base station 30. The mobile station 26 is in a soft handoff mode between the base stations 30 and 32 and, therefore, is considered an E-DCH user at both of those base stations. The mobile station 28 is an E-DCH user at the base station 32. In the illustrated example, the mobile station 28 is a non-E-DCH user at the base station 30.

Each of the base stations communicate with a radio network controller (RNC) 52 that operates in a known manner. In some examples, the RNC 52 includes load control algorithms for controlling the load associated with non-E-DCH users at a base station, for example.

One aspect of an example load control technique includes determining values of the portions of the total uplink interference associated with E-DCH users at a base station and non-E-DCH users at that base station, respectively. Such determinations may be made for individual carriers at a base station, individual sectors served by a base station or an entire cell served by a base station. Given this description, those skilled in the art will realize at what level to apply the techniques of the disclosed examples to meet their particular needs. For purposes of discussion, interference measurement associated with an entire cell is considered in this description. The base station 30 is considered as an example for discussion purposes.

The E-DCH users such as the mobile stations 22, 24 and 26 in the example of FIG. 1 for the example base station 30 are the users that are controlled by the E-DCH scheduler of the control module 40, for example. The main contribution of the E-DCH users to the uplink interference is from the E-DCH dedicated physical data channel (E-DPDCH) of the scheduled users. Non-E-DCH users are those users, which are not controlled by the E-DCH scheduler of the control module 40 of the base station 30.

In FIG. 1, the mobile station 28 is considered one of the non-E-DCH users. Within this category, one example includes summing up all contributions from dedicated channels (e.g., DPCCH and DPDCH) and the high-speed dedicated (uplink) physical control channel (HS-DPCCH). The contribution from the E-DPDCH of the non-scheduled E-DCH users is also considered because such users are controlled by the RNC 52. In one example, the contribution of the E-DPCCH is included as contributing to the non-E-DCH user portion of the uplink interference.

In one example, a user with simultaneous transmissions on a dedicated channel (DCH) and E-DCH is accounted separately as a E-DCH user and a non-E-DCH user.

For discussion purposes, Kn is the number of non-E-DCH users with active radio links within the cell under consideration and the interference portion caused by the non-E-DCH users $I_{non-EDCH}$ is represented by the notation $\Sigma_{Kn}E_{non-EDCH}$. Ke is the number of E-DCH users with active radio links within the cell. The interference portion caused by such users $I_{EDCH}$ is represented by the notation $\Sigma_{Ke}E_{EDCH}$. The background noise is represented by $I_b$. An individual user is represented by k.

There are known techniques for determining high accuracy signal-to-interference-plus-noise ratio (SIR) measurements of the particular users and for obtaining those measurements at a base station. For a non-E-DCH user, k:

$$SIR^k_{non-EDCH} = \frac{E^k_{non-EDCH}}{\sum_{Kn} E_{non-EDCH} + \sum_{Ke} E_{EDCH} + I_b},$$

Similarly, for a E-DCH user the SIR can be described using the following:

$$SIR_{EDCH}^k = \frac{E_{EDCH}^k}{\sum_{Kn} E_{non\text{-}EDCH} + \sum_{Ke} E_{EDCH} + I_b}.$$

The total non-E-DCH SIR, therefore, can be described by:

$$SIR_{non\text{-}EDCH} = \frac{\sum_{Kn} E_{non\text{-}EDCH}}{\sum_{Kn} E_{non\text{-}EDCH} + \sum_{Ke} E_{EDCH} + I_b},$$

and the total E-DCH SIR given by:

$$SIR_{EDCH} = \frac{\sum_{Ke} E_{EDCH}}{\sum_{Kn} E_{non\text{-}EDCH} + \sum_{Ke} E_{EDCH} + I_b}.$$

When the channel conditions are approximately the same for two measurement intervals, the E-DCH energy at measurement interval n is proportional to the previous measurement interval n−δ as $$\sum_{Kn} E_{non\text{-}EDCH}[n] \approx k_{non\text{-}EDCH}^{\delta} \cdot \sum_{Kn} E_{non\text{-}EDCH}[n-\delta]$$

$$\sum_{Ke} E_{EDCH}[n] \approx k_{EDCH}^{\delta} \cdot \sum_{Ke} E_{EDCH}[n-\delta],$$

where the constants $k_{non\text{-}EDCH}^{\delta}$ and $k_{EDCH}^{\delta}$ are known from the different power or gain settings in the measurement periods, respectively. One example includes obtaining a system of linear equations for two measurement periods n and n−1 as $$\begin{bmatrix} SIR_{non\text{-}EDCH}[n]-1 & SIR_{non\text{-}EDCH}[n] & SIR_{non\text{-}EDCH}[n] & 0 \\ SIR_{EDCH}[n] & SIR_{EDCH}[n]-1 & SIR_{EDCH}[n] & 0 \\ k_{non\text{-}EDCH}^{1}SIR_{non\text{-}EDCH}[n-1]-1 & k_{EDCH}^{1}SIR_{non\text{-}EDCH}[n-1] & 0 & SIR_{non\text{-}EDCH}[n] \\ k_{non\text{-}EDCH}^{1}SIR_{EDCH}[n-1] & k_{EDCH}^{1}SIR_{EDCH}[n-1]-1 & 0 & SIR_{EDCH}[n] \end{bmatrix}$$

$$\begin{bmatrix} \sum_{Kn} E_{non\text{-}EDCH}[n] \\ \sum_{Ke} E_{EDCH}[n] \\ I_b[n] \\ I_b[n-1] \end{bmatrix} \approx \begin{bmatrix} 0 \\ 0 \\ 0 \\ 0 \end{bmatrix}$$

which can be generalized for an arbitrary number of measurement periods as an overdetermined, homogeneous set of linear equations given by $$\begin{bmatrix} SIR_{non\text{-}EDCH}[n]-1 & SIR_{non\text{-}EDCH}[n] & SIR_{non\text{-}EDCH}[n] & 0 & \cdots & \cdots & 0 \\ SIR_{EDCH}[n] & SIR_{EDCH}[n]-1 & SIR_{EDCH}[n] & 0 & \cdots & \cdots & 0 \\ k_{non\text{-}EDCH}^{1}SIR_{non\text{-}EDCH}[n-1]-1 & k_{EDCH}^{1}SIR_{non\text{-}EDCH}[n-1] & 0 & SIR_{non\text{-}EDCH}[n] & 0 & \cdots & 0 \\ k_{non\text{-}EDCH}^{1}SIR_{EDCH}[n-1] & k_{EDCH}^{1}SIR_{EDCH}[n-1]-1 & 0 & SIR_{EDCH}[n] & 0 & \cdots & 0 \\ \vdots & \vdots & \vdots & \ddots & \ddots & \ddots & 0 \\ k_{non\text{-}EDCH}^{\delta}SIR_{non\text{-}EDCH}[n-\delta]-1 & k_{EDCH}^{\delta}SIR_{non\text{-}EDCH}[n-\delta] & 0 & \cdots & \cdots & 0 & SIR_{non\text{-}EDCH}[n-\delta] \\ k_{non\text{-}EDCH}^{\delta}SIR_{EDCH}[n-\delta] & k_{EDCH}^{\delta}SIR_{EDCH}[n-\delta]-1 & 0 & \cdots & \cdots & 0 & SIR_{EDCH}[n-\delta] \end{bmatrix}.$$

$$\begin{bmatrix} \sum_{Kn} E_{non\text{-}EDCH}[n] \\ \sum_{Ke} E_{EDCH}[n] \\ I_b[n] \\ I_b[n-1] \\ \vdots \\ \vdots \\ I_b[n-\delta] \end{bmatrix} \approx \begin{bmatrix} 0 \\ 0 \\ 0 \\ 0 \\ 0 \\ 0 \\ 0 \end{bmatrix}$$

An optimum solution to the above system of linear equations is obtained in one example by total least squares error methods. One example includes the recognition that the channel conditions may be slowly time-varying such that the channel conditions may have changed between the older measurement periods and the most recent measurement period. Hence, one example includes attributing a larger error to the older measurement equations at the bottom of the system of linear equations when compared with the most recent measurement equations at the top of the system of linear equations. In this example, multiplication with a diagonal matrix at the left yields an uneven error distribution in the total least squares solution as shown by $$\begin{bmatrix} w_n & 0 & 0 & 0 & \cdots & 0 & 0 \\ 0 & w_n & 0 & \vdots & \ddots & \ddots & 0 \\ \vdots & 0 & w_{n-1} & 0 & \vdots & \ddots & 0 \\ 0 & \vdots & 0 & w_{n-1} & 0 & \vdots & 0 \\ 0 & \ddots & \vdots & 0 & \ddots & 0 & \vdots \\ 0 & \ddots & \ddots & \vdots & 0 & w_{n-\delta} & 0 \\ 0 & 0 & 0 & 0 & \cdots & 0 & w_{n-\delta} \end{bmatrix}.$$

$$\begin{bmatrix} SIR_{non\text{-}EDCH}[n]-1 & SIR_{non\text{-}EDCH}[n] & SIR_{non\text{-}EDCH}[n] & 0 & \cdots & \cdots & 0 \\ SIR_{EDCH}[n] & SIR_{EDCH}[n]-1 & SIR_{EDCH}[n] & 0 & \cdots & \cdots & 0 \\ k^1_{non\text{-}EDCH}SIR_{non\text{-}EDCH}[n-1]-1 & k^1_{EDCH}SIR_{non\text{-}EDCH}[n-1] & 0 & SIR_{non\text{-}EDCH}[n] & 0 & \cdots & 0 \\ k^1_{non\text{-}EDCH}SIR_{EDCH}[n-1] & k^1_{EDCH}SIR_{EDCH}[n-1]-1 & 0 & SIR_{EDCH}[n] & 0 & \cdots & 0 \\ \vdots & \vdots & \vdots & \ddots & \ddots & \ddots & 0 \\ k^\delta_{non\text{-}EDCH}SIR_{non\text{-}EDCH}[n-\delta]-1 & k^\delta_{EDCH}SIR_{non\text{-}EDCH}[n-\delta] & 0 & \cdots & \cdots & 0 & SIR_{non\text{-}EDCH}[n-\delta] \\ k^\delta_{non\text{-}EDCH}SIR_{EDCH}[n-\delta] & k^\delta_{EDCH}SIR_{EDCH}[n-\delta]-1 & 0 & \cdots & \cdots & 0 & SIR_{EDCH}[n-\delta] \end{bmatrix}.$$

$$\begin{bmatrix} \sum_{Kn} E_{non\text{-}EDCH}[n] \\ \sum_{Ke} E_{EDCH}[n] \\ I_b[n] \\ I_b[n-1] \\ \vdots \\ \vdots \\ I_b[n-\delta] \end{bmatrix} \approx \begin{bmatrix} 0 \\ 0 \\ 0 \\ 0 \\ 0 \\ 0 \\ 0 \end{bmatrix}$$

where $w_{n-\delta} \leq w_{n-\delta+1} \leq \ldots \leq w_{n-1} \leq w_n$. A sliding window approach is used in one example that includes dropping an old measurement equation whenever a new measurement equation is obtained, so that the dimension of the problem is preserved. In other words, even though new data is added, a selected number of linear equations corresponding to a selected number of time intervals remains in the set of equations.

A total least squares solution to the system of linear equations is obtained in this example as the right singular vector corresponding to the smallest singular value of the above matrix as $$\begin{bmatrix} \sum_{Kn} E_{non\text{-}EDCH}[n] \\ \sum_{Ke} E_{EDCH}[n] \\ I_b[n] \\ I_b[n-1] \\ \vdots \\ \vdots \\ I_b[n-\delta] \end{bmatrix} = \lambda \cdot SV \left\{ \begin{bmatrix} w_n & 0 & 0 & 0 & \cdots & 0 & 0 \\ 0 & w_n & 0 & \vdots & \ddots & \ddots & 0 \\ \vdots & 0 & w_{n-1} & 0 & \vdots & \ddots & 0 \\ 0 & \vdots & 0 & w_{n-1} & 0 & \vdots & 0 \\ 0 & \ddots & \vdots & 0 & \ddots & 0 & \vdots \\ 0 & \ddots & \ddots & \vdots & 0 & w_{n-\delta} & 0 \\ 0 & 0 & 0 & 0 & \cdots & 0 & w_{n-\delta} \end{bmatrix} \right\}.$$

equation 1

$$\begin{bmatrix} SIR_{non-EDCH}[n]-1 & SIR_{non-EDCH}[n] & SIR_{non-EDCH}[n] & 0 & \cdots & \cdots & 0 \\ SIR_{EDCH}[n] & SIR_{EDCH}[n]-1 & SIR_{EDCH}[n] & 0 & \cdots & \cdots & 0 \\ k^1_{non-EDCH}SIR_{non-EDCH}[n-1]-1 & k^1_{EDCH}SIR_{non-EDCH}[n-1] & 0 & SIR_{non-EDCH}[n] & 0 & \cdots & 0 \\ k^1_{non-EDCH}SIR_{EDCH}[n-1] & k^1_{EDCH}SIR_{EDCH}[n-1]-1 & 0 & SIR_{EDCH}[n] & 0 & \cdots & 0 \\ \vdots & \vdots & \vdots & \ddots & \ddots & \ddots & 0 \\ k^\delta_{non-EDCH}SIR_{non-EDCH}[n-\delta]-1 & k^\delta_{EDCH}SIR_{non-EDCH}[n-\delta] & 0 & \cdots & \cdots & 0 & SIR_{non-EDCH}[n-\delta] \\ k^\delta_{non-EDCH}SIR_{EDCH}[n-\delta] & k^\delta_{EDCH}SIR_{EDCH}[n-\delta]-1 & 0 & \cdots & \cdots & 0 & SIR_{EDCH}[n-\delta] \end{bmatrix}$$

where $\lambda$ is an arbitrary unknown scaling factor. Some examples utilize simple iterative methods for obtaining the singular vector corresponding to the smallest singular value, such as inverse power iterations or Lanczos methods.

Equation 1 provides a relative output vector, which in theory can be scaled by any arbitrary value. The absolute values for $\Sigma_{Kn}E_{non-EDCH}[n]$, $\Sigma_{Ke}E_{EDCH}[n]$ and $I_b[n]$ can for example be determined from explicitly solving the following relation:

$$\sum_{Kn} E_{non-EDCH} + \sum_{Ke} E_{EDCH} + I_b = I_0 \qquad \text{equation 2}$$

According to one example, at each radio frame the most recent data regarding the measurements from the individual users is obtained. In an example UMTS system, each radio frame corresponds to 10 msec and the data collection includes all measurements from the previous 10 msec. In one example, the measurements obtained from the individual users include the physical layer measurements of the data-chip energy to total interference ratio ($E_c/I_o$) and the traffic to pilot ratio (TPR). In one example, the $E_c/I_o$ on the DPCCH is considered and the TPR is the traffic to pilot power ratio between a physical data channel under consideration and the DPCCH. The most recent RTWP measurement is also considered.

Figure 2:
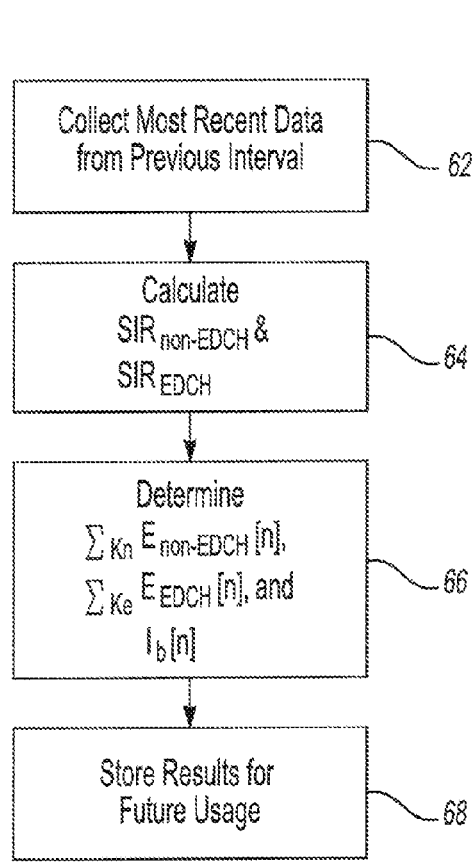
FIG. 2 is a flowchart diagram summarizing one example approach.

FIG. 2 includes a flowchart diagram 60 summarizing one example approach. The collection of data from the physical layer measurements is shown at 62.

The SIR for the E-DCH users and the non-E-DCH users, respectively, is determined at 64. One example includes using the following relationships where $E_c$ is the energy per chip as measured for the DPCCH, e.g. from using the pilot symbols and $I_o$ is the total interference, also measured for the DPCCH.

$$SIR_{non-EDCH}[n] = \sum_{Kn} \frac{E_c}{I_0} \cdot \begin{pmatrix} 1 + TPR_{DPDCH} + TPR_{HS-DPCCH} + \\ TPR_{E-DPCCH} + TPR_{E-DPDCH/INST} \end{pmatrix}$$

$$SIR_{EDCH}[n] = \sum_{Ke} \frac{E_c}{I_0} \cdot TPR_{E-DPDCH}$$

At 66 in FIG. 2, this example includes determining relative values of the interference portions associated with the E-DCH users and the non-E-DCH users, respectively by solving equation 1 above. The absolute values are obtained from the normalization provided by equation 2 above.

As schematically shown at 68, the parameters determined at 66, the values determined at 64 and the background noise for the measurement period are stored. In one example, these parameters are stored as the most recent set of measurement values and the currently oldest set of these values is dropped for purposes of use in the linear equation arrangement described above.

In some examples, the E-DCH user portion is further divided into serving and non-serving power portions. This allows an E-DCH scheduler to make a decision to send a non-serving relative grant to the non-serving users based upon the ratio between the non-serving and total E-DCH user power portion.

The non-E-DCH user portion can be signaled to the RNC 52, which will perform uplink load control for non-E-DCH users. The background noise estimate can be input to the E-DCH scheduler at the control module 40, which can estimate the total uplink load together with RTWP.

The same procedure occurs at the next periodical trigger time, which corresponds to the next frame in one example. The determined values for the E-DCH user and non-E-DCH user interference portions are useable in scheduling and load control techniques. Additionally, the determined values may be post-processed for other purposes. For example, in UMTS systems, measurement samples are generated with averaging over each 100 msec (e.g., every 10 frames). Those measurement samples may be further filtered and measurement reports to a radio network controller 52 may be generated periodically or on specific measurement events as defined by an appropriate UMTS standard.

The disclosed examples combine RTWP measurements with individual user SIR measurements and provide significantly improved accuracy of absolute power measurements. The disclosed examples provide the advantage of improving the estimation of the load portions using advanced signal processing. One advantage to the disclosed examples is that they provide estimates of background noise and loading associated with non-E-DCH users and E-DCH users, respectively. The disclosed examples take advantage of individual SIR measurements that are already available, which are more accurate than pure absolute measurements such as RTWP measurements as have been used previously.

One advantage of the disclosed example is that it has the potential to deliver absolute measurements with the same level of accuracy that is known from power ratios.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of facilitating wireless communications, comprising:
   determining a first portion of an uplink interference associated with at least one first user controlled by a scheduler based upon measurements from at least the one first user that indicate a data-chip energy to total interference ratio and a traffic to pilot ratio; and determining a second portion of the uplink interference associated with at least one second user not controlled by the scheduler based upon measurements from the at least one second user that indicate a data-chip energy to total interference ratio and traffic to pilot power ratio.

2. The method of claim 1, comprising controlling a load at a base station associated with the scheduler based upon the determined first and second portions of the uplink interference.

3. The method of claim 1, comprising scheduling at least one user based upon at least the determined first portion of the uplink interference.

4. The method of claim 1, wherein there are a plurality of the first users and a plurality of the second users and comprising determining a corresponding plurality of first products of the measurements from each of the first users;

determining a first sum of the determined plurality of first products;

determining a corresponding plurality of second products of the measurements from each of the second users; and determining a second sum of the determined plurality of second products.

5. The method of claim 4, wherein the determined first sum indicates a signal to interference ratio of the first users and the determined second sum indicates a signal to interference ratio of the second users.

6. The method of claim 4, comprising determining the first sum and the second sum, respectively, for each of a plurality of time intervals;

establishing a set of linear equations that includes at least the determined sums; and using the established set of linear equations for determining a value of the first and second portions of the uplink interference, respectively.

7. The method of claim 6, comprising determining an estimated value of each of the first and second portions from the set of linear equations; and determining an absolute value of each of the first and second portions by normalizing the corresponding determined estimated values.

8. The method of claim 7, comprising determining the estimated value by determining a right singular vector corresponding to a smallest singular value of the set of linear equations.

9. The method of claim 7, comprising determining the absolute values from a relationship between each of the first and second portions, a background interference and a total uplink interference.

10. The method of claim 6, comprising weighting an influence that at least a selected one of linear equations has on the determined values based upon a difference in time between a current time and the time interval corresponding to the selected one of the linear equations.

11. The method of claim 10, comprising progressively decreasing the influence of each of the linear equations as the linear equations become older in time.

12. The method of claim 6, comprising selecting a number of the time intervals for the establishing step; and dropping an oldest of the linear equations from the established set each time that a new linear equation corresponding to a new time interval is available such that a number of linear equations in the established set remains consistent with the selected number of time intervals.

13. The method of claim 1, comprising determining the first and second portions periodically.

14. The method of claim 13, comprising determining the first and second portions at each time corresponding to a frame.

15. The method of claim 13, comprising storing a plurality of the determined first and second portions and using the stored portions as part of a set of linear equations for determining a next one of the first and second portions.

16. The method of claim 1, comprising determining a received total wideband power at a base station associated with the scheduler; and using the determined received total wideband power and the measurements from the at least one first and second users for determining the first and second portions.

17. The method of claim 1, comprising determining a background noise portion of the uplink interference.

18. The method of claim 1, wherein the first user is distinct from the second user.

* * * * *